May 22, 1928.
I. B. SMITH
1,670,640
CONDUCTIVITY CELL
Filed May 20, 1925
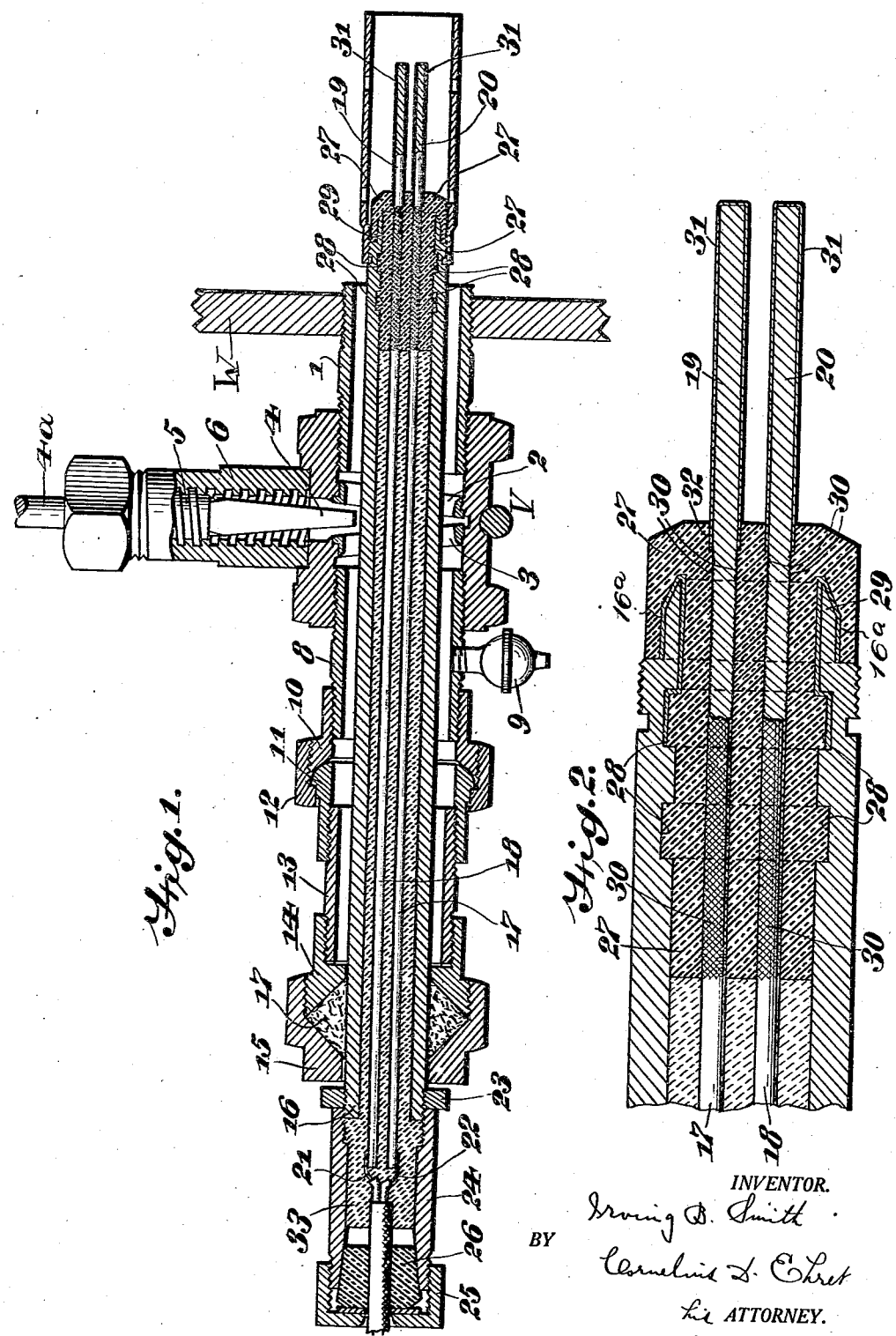
INVENTOR.
Irving B. Smith
BY Cornelius L. Ehret
his ATTORNEY.

Patented May 22, 1928.

1,670,640

UNITED STATES PATENT OFFICE.

IRVING B. SMITH, OF AMBLER, PENNSYLVANIA, ASSIGNOR TO LEEDS & NORTHRUP COMPANY, OF PHILADELPHIA, PENNSYLVANIA, A CORPORATION OF PENNSYLVANIA.

CONDUCTIVITY CELL.

Application filed May 20, 1925. Serial No. 31,507.

My invention relates to apparatus for measuring the resistivity or conductivity of materials whose resistance change with temperature, as an electrolyte.

In measuring electrical conductivity or resistivity of electrolytes, it is customary to immerse two electrodes in the solution and measure the resistance between electrodes. Heretofore, the electrodes have been held in fixed relation one to the other by insulating material such as glass or porcelain. The use of such materials, however, is objectionable in various respects, among which may be mentioned the fragility of glass or porcelain and its tendency to crack when subjected to rapid temperature change. Wires having a small diameter can be successfully sealed into glass or porcelain and used as electrodes but the resulting structure is not of sufficient strength to prevent bending. Furthermore, apparatus of this character is often provided with a metallic housing for attachment to a pipe line or vat and when glass or porcelain is used as the insulating medium between the electrodes and the housing, a liquid tight joint at the housing can be obtained only with great difficulty. This is particularly true when the arrangement is subjected to fairly high pressure.

In accordance with my invention, moldable insulating material, as bakelite, condensite or equivalent is utilized as the insulating and supporting medium for electrodes or electrode leads, or other conductive bodies.

Further, in accordance with my invention the housing is initially coated or plated with a suitable metal to effect a more intimate relation with the moldable insulating material.

Further, in accordance with my invention any one or more of electrodes or conductive bodies adapted for insertion in an electrolyte are initially coated or provided in part at least with capsules of a metal that will not react with the electrolyte.

For an illustration of one of the various forms my structure may take, reference is to be had to the accompanying drawing, in which:

Figure 1 is a longitudinal sectional view of structure embodying my invention.

Fig. 2 is a sectional view on an enlarged scale of my improved apparatus.

Referring to Fig. 1, W indicates the wall of any vessel, such as a condensate chamber or hot well on a steam condenser, or of any other chamber, pipe, etc., the contents whereof are either at rest or in motion.

The interior of the vessel will be understood as lying to the right of the wall W and the exterior as lying to the left thereof.

Threaded into an aperture in the wall W is a pipe or nipple 1 also threaded into the valve structure V, preferably a gate valve comprising the valve seat members 2 and 3, with which co-acts the movable valve member or gate 4 actuated by the screw 5 threaded in the member 6 and in turn actuated by the hand wheel (not shown) on the stem $4^a$. In the other end of the body of the valve structure is threaded the pipe or nipple 8 through the wall of which may be threaded a drain cock 9. The other end of the nipple 8 is threaded into the member 10 forming with the member 11 a ground union, the members 10 and 11 being held in engagement with each other by the nut member 12. Also threaded into the union member 11 is the pipe or nipple 13 threaded into the member 14 which, with the sleeve 15 threaded thereon, forms a stuffing box or gland.

Extending longitudinally through the gland or stuffing box, nipple 13, ground union, nipple 8, gate valve, and nipple 1 is the tube or pipe 16 of brass, nickel, or other suitable material. In the stuffing box 14, 15 is the packing material 17 forced into intimate contact with the exterior of the tube 16 by screwing up the nut member 15.

Secured within the tube 16 as hereinafter described are the electro-conducting members, electrodes, or electrode leads 17, 18 terminating at one end in the electrodes proper 19 and 20, their other ends being connected to suitable conductors 21 and 22. Threaded to the end of the tube 16 remote from the electrodes proper are the collar 23 and couplings 24, a cap 25 being threaded on the coupling and adapted to exert suitable compression upon the soft rubber plug 26.

In assembling my improved device the electrodes are properly positioned within the tube 16 and the various parts are then rigidly held in spaced relation by suitable gripping mechanism. Suitable mold members are then placed in position, the molding material 27 introduced, and molding operations, as application of heat and pressure effected. After the material solidifies, the mold members are removed. An insulating compound 33 of any character which is solid at ordinary temperatures may be poured into the tube 16 while hot, thereafter congealing around the electrode leads 17 and 18.

Preferably, the inner surface of the tube 16 may be formed with a groove or grooves 28 with which the moldable material interlocks to effect a rigid union and a joint more resistive to the entry of liquid. If desired, the structure may be made still more rigid and effective against the entry of liquid by the provision at the end of the tube 16 of an extending collar 29 having a reduced outer diameter, against which the moldable material impinges with considerable pressure. Further, if desired a more intimate relation may be effected between the electrode leads 17 and 18 and the moldable material 27 by the provision of knurled surfaces 30 on one or both of the electrode leads.

In a device constructed as described the electrode must be made relatively large in size and, therefore, it is desirable to use inexpensive base metal, such as hard copper, nickel or steel. Metal of this character is not suitable for insertion into some solutions, and to remedy this defect thin coatings or capsules 31 of noble metal, such as of gold or platinum, preferably platinized, may be deposited on or forced over the ends of the electrodes. The capsules or coatings are usually applied to the electrodes prior to the molding operation and preferably they extend a sufficient distance along the electrode rods that the moldable material will contact therewith as indicated at 32, and more effectually seal the base metal against the action of any solution which may thereafter surround the coatings or capsules.

When the tube 16 is constructed of brass, as is usually the case, it is advisable that the inner or outer surfaces, or both be coated with either copper, nickel or gold, as indicated at 16ª, Fig. 2, these metals giving improved results in the order named, gold being preferable. When coated in this manner, the moldable material will adhere more firmly to its engaging surface thereby giving an additional measure of security against leakage of the liquid even under high pressures.

What I claim is:

1. Electrical measuring apparatus comprising a casing having a projection of reduced outer diameter, electrode structure within said casing, and means comprising moldable material forming a liquid tight joint with said structure and impinging against said projection on the exterior thereof to form a liquid tight joint at said casing.

2. Electrical measuring apparatus comprising a casing of one metal coated with another metal, electrode structure within said casing, and means comprising moldable material around said electrode structure and effecting an intimate contact with the coating metal of said casing.

3. Electrical measuring apparatus comprising a casing having a plated surface, electrode structure within said casing, and means comprising moldable material effecting an intimate contact with said plated surface.

4. Electrical measuring apparatus comprising a brass casing with a gold-plated portion, electrode structure within said casing, and means comprising moldable material effecting an intimate contact with said gold-plated casing.

5. Electrical measuring apparatus for introduction into an electrolyte comprising electrode structure of one metal, a capsule of another metal carried thereby, and insulating material molded around said structure and a portion of said capsule.

6. Electrical measuring apparatus for introduction into an electrolyte comprising electrode structure of base metal, a capsule carried thereby, and insulating material molded around a portion of said structure and capsule.

7. Electrical measuring apparatus for introduction into an electrolyte comprising electrode structure of base metal, a capsule of noble metal carried thereby, and insulating material molded around a portion of said structure and capsule.

8. Electrical measuring apparatus for introduction into an electrolyte comprising electrode structure of base metal, a gold capsule carried thereby, and insulating material molded around a portion of said structure and capsule.

9. Electrical measuring apparatus for introduction into an electrolyte comprising electrode structure of hard copper, a capsule carried thereby, and insulating material molded around a portion of said structure and capsule.

10. Electrical measuring apparatus for introduction into an electrolyte comprising electrode structure of hard copper, a gold capsule carried thereby, and insulating material molded around a portion of said structure and capsule.

IRVING B. SMITH.